(12) United States Patent
Bohler

(10) Patent No.: US 8,695,855 B2
(45) Date of Patent: Apr. 15, 2014

(54) DOSAGE-DISPENSING UNIT FOR DOSAGE MATERIAL OF A POWDERY OR GRANULAR CONSISTENCY

(75) Inventor: Lorenz Bohler, Möhlin (CH)

(73) Assignee: Mettler-Toledo AG, Greifensee (CH)

( * ) Notice: Subject to any disclaimer, the term of this patent is extended or adjusted under 35 U.S.C. 154(b) by 105 days.

(21) Appl. No.: 13/298,646

(22) Filed: Nov. 17, 2011

(65) Prior Publication Data
US 2012/0132674 A1    May 31, 2012

(30) Foreign Application Priority Data

Nov. 29, 2010  (EP) .................................. 10192865

(51) Int. Cl.
*A61J 11/00*  (2006.01)
*G01F 13/00*  (2006.01)
(52) U.S. Cl.
CPC .................................. *G01F 13/001* (2013.01)
USPC ........... 222/203; 222/196; 222/200; 222/202; 222/490; 222/494; 222/161
(58) Field of Classification Search
USPC ......... 222/203, 196, 200, 202, 490, 494, 161, 222/198, 542
See application file for complete search history.

(56) References Cited

U.S. PATENT DOCUMENTS

| 3,746,198 | A | * | 7/1973 | Howland | 215/11.1 |
| 5,156,286 | A | * | 10/1992 | Piccard | 215/232 |
| 5,348,188 | A | * | 9/1994 | Bohler | 222/1 |
| 5,490,938 | A | * | 2/1996 | Sawan et al. | 210/651 |
| 5,697,523 | A | * | 12/1997 | Brandauer | 222/58 |
| 6,253,966 | B1 | * | 7/2001 | Dinkel | 222/198 |
| 7,104,293 | B2 | | 9/2006 | Lais et al. | |
| 2010/0147882 | A1 | | 6/2010 | Bohler | |

FOREIGN PATENT DOCUMENTS

SU  1191370 A  *  5/1984  ............. B65D 88/64

* cited by examiner

*Primary Examiner* — Kevin P Shaver
*Assistant Examiner* — Michael J Melaragno
(74) *Attorney, Agent, or Firm* — Standley Law Group LLP

(57) ABSTRACT

A unit for dispensing a dosage material of a powdery or granular consistency has a housing and at least one dispensing head. At least one reservoir cavity is formed inside the housing and serves to receive dosage material. The at least one dispensing head is formed of an elastomeric material. The dispensing head has an outlet which is slit-shaped in its non-deformed state and is delimited by a first outlet lip and a second outlet lip. The outlet can be opened to a variable width by the application of a lateral compressive force. The arrangement further includes at least a first motion-transmitting means designed to impart an oscillatory movement to the first outlet lip relative to, and in the lengthwise direction of, the second outlet lip.

19 Claims, 4 Drawing Sheets

DOSAGE-DISPENSING UNIT FOR DOSAGE MATERIAL OF A POWDERY OR GRANULAR CONSISTENCY

CROSS-REFERENCE TO RELATED APPLICATIONS

This application is entitled to benefit of a right of priority under 35 USC §119 from European patent application EP 10192865.3, which was filed on 29 Nov. 2010, and the content of which is incorporated by reference as if fully recited herein.

TECHNICAL FIELD

The present invention concerns a dosage-dispensing unit for granulated or powdery substances.

BACKGROUND

Dosage-dispensing units of this type are used to dispense measured doses of substances with high precision. This involves delivering a desired quantity of substance from the dosage-dispensing unit into a target container. Such target containers are in many cases set on a balance in order to weigh the quantity of the substance discharged from the dosage-dispensing unit, so that the substance can subsequently be processed in accordance with given instructions.

A dosage-dispensing unit described in U.S. Pat. No. 5,348,188, which is an invention of the present inventor, includes a housing with a receptacle for dosage material and with a dispensing head consisting of an elastomeric material. The dispensing head is designed like the nipple of a baby bottle and has a slit-shaped outlet which can be opened from the outside by applying a lateral force or pressure from two opposite sides. To prevent the dosage material from conglomerating into powder bridges during the dispensing process, a needle-shaped actuator is arranged to break them up. Before the dispensing operation is started, the needle-shaped actuator is pushed from the side through the elastomeric material and advanced far enough that the point of the needle reaches through the slit-shaped outlet. With this dosage-dispensing unit, it is possible to dispense the smallest quantities of powdery dosage material with high precision. However, the arrangement has the drawback that by reaching through the slit-shaped outlet, the actuator prevents the lips of the slit from closing tightly in the vicinity of the actuator, thus leaving a small leak in this area. As long as the substance particles are larger than the width of this leak, this does not present a problem, but with smaller particles it could happen that minute amounts may escape through the leak. To solve this problem, the needle-shaped actuator can be pulled back far enough, so that its needle point is inside the dispensing head. However, it is also possible for leaks to be caused by larger particles that get trapped between the closing lips.

It is therefore the object of the present invention to modify the aforementioned dosage-dispensing unit in such a way that the outlet orifice can always be securely closed.

SUMMARY

This task is solved with a dosage-dispensing unit that has the features presented in the independent claim.

A dosage-dispensing unit for dosage material of a powdery or granular consistency includes a housing, at least one reservoir cavity that is formed inside the housing and serves to receive dosage material, and at least one dispensing head comprising an elastomeric material. The dispensing head has an outlet which is slit-shaped in its non-deformed state and is delimited by a first outlet lip and a second outlet lip, and which can be opened to a variable width by the application of a lateral compressive force. The arrangement further includes at least a first motion-transmitting means designed to impart an oscillatory movement to the first outlet lip relative to, and in the lengthwise direction of, the second outlet lip. The oscillatory movement of the first outlet lip in the lengthwise direction of the second outlet lip in accordance with the invention has the effect that remaining particles of dosage material during the closing of the outlet are removed from the area between the outlet lips and that, consequently, no particles are trapped between the closed outlet lips. This makes the closure function of the dispensing head extremely reliable, a point of particular importance if the substances to be dispensed are highly toxic. Due to the movement of the outlet lips, the desired quantity of dosage material can be dispensed with even higher precision than would be possible with the device disclosed in the inventor's prior U.S. Pat. No. 5,348,188, as the movements of the outlet lips according to the invention make it possible to close the outlet more rapidly. The function of the dispensing head, in particular the opening and closing of the outlet orifice, is realized in the present invention in the same way as in inventor's cited patent, which covers this aspect in detail and whose content is hereby included by reference in its entirety in the description of the present invention.

Depending on the design of the internal contours of the dispensing head, the oscillatory movements further have the result of increasing the discharge flow rate and thus raising the delivery rate of the dosage material from the outlet orifice, as the movements propagate into the dosage material inside the dispensing head where they are able to prevent the formation of powder bridges.

In a further developed embodiment of the invention, the oscillatory movements of the first outlet lip in the lengthwise direction can be accompanied by secondary oscillatory movements that are orthogonal to the lengthwise direction and to the closing direction of the outlet lips. Of course these secondary movements can only be very small, so that the amplitude of the secondary movement is not larger than the width of the outlet lips. If the amplitude were larger than the width of the outlet lips, the secondary movement would cause a periodic partial opening of the outlet orifice, as the outlet lips could no longer completely overlap each other.

The arrangement can further include a second motion-transmitting means, whereby an oscillatory movement can also be imparted to the second outlet lip. In order for the inventive effect to take place, so that dosage material particles caught between the outlet lips will be removed, the oscillatory movements of the first outlet lip in relation to those of the second outlet lip need to be at least of different amplitude and/or opposed to each other in their parallel directions.

The motion-transmitting means can be configured as a zone of increased stiffness in the elastomeric material of the dispensing head, wherein the zone of increased stiffness adjoins the respective outlet lip and includes a connector area for a motion-transmitting member. The increased stiffness can be achieved in different ways, for example by locally bulking up the elastomeric material or by locally including stiffer materials, by imbedding rigid reinforcement elements and the like. Especially the modern injection-molding processes for plastics offer nearly unlimited design freedom with elastomers of different Shore hardness.

The connector area does not necessarily have to be configured as a coupling element or as a zone that is configured specifically to perform a connecting function. It can also be a material transition from the motion-transmitting means to the motion-transmitting member. This is the case, for example, if the motion-transmitting means includes an integrally formed projection that serves as motion-transmitting member.

The movements of the outlet lips are produced by at least one drive mechanism which acts on the motion-transmitting means. A simple solution is to connect a slender, needle-shaped rod to the connector area as a motion-transmitting member. The needle-shaped rod is thus arranged between the drive mechanism and the motion-transmitting means.

As a further means to prevent the formation of powder bridges, an actuator can be arranged in the reservoir cavity and connected to the motion-transmitting means. This actuator can, for example, take the form of a wire shaped into a spiral that is connected to a suitable anchoring place of the motion-transmitting means, which is formed in the vicinity of the outlet orifice. The wire spiral extends from the dispensing head into the reservoir cavity. The length of the wire spiral and its stiffness can be matched to the dosage material that is to be dispensed.

It should be understood that the dosage-dispensing unit of the present invention may in addition include a needle-shaped actuator which pierces through an elastomeric wall of the dispensing head, as disclosed in the inventor's prior cited patent. However, the point of the needle may not reach through the outlet orifice of the dispensing head, as this might compromise the tightness of the outlet orifice, as mentioned above. Consequently, one end of the activator needle is arranged in the reservoir cavity and the other end is connected to a drive mechanism of the motion-transmitting means or to an actuator drive mechanism.

In order to make the dosage-dispensing unit suitable for use as a storage container, and also to prevent the outlet orifice from being opened unintentionally during manual or automated activities, a protective cap can be added to be put over the outlet orifice and completely cover the outlet lips of the dispensing head. The protective cap is not removed until the dosage-dispensing unit is set into the dispensing-unit holder of a compatible dosage-dispensing instrument.

As a means to seal the dispensing head more tightly, a seal ring can be integrally formed on an elastomeric wall portion of the dispensing head on the side that faces away from the reservoir cavity. The use of this seal ring is not limited to holding the protective cap more securely on the dispensing head by contact pressure and/or providing a gas-tight seal. Optionally, this seal ring can also be used to fasten an adjoining vessel, for example a hose, a tube or the like to the dispensing head in order to seal the ring gap between the dispensing head and the adjoining vessel sufficiently that the ambient environment cannot be contaminated by dosage material escaping to the outside. If the vessel has a groove that fits over the seal ring, the vessel can be joined to the dispensing head through a form-fitting connection. However, this does not necessarily exclude other possible configurations. It is also conceivable to use a flange connection, a screw-threaded connection, an adhesively bonded or welded connection, as well as snap connections and press fits.

Due to its simple design and manufacture, the dispensing head of the present invention is excellently suited as a one-way article, which can be correctly disposed of after it has been used. For this type of application, the outlet in the new, unused condition can be covered for example with a removable film which is taken off after the dosage-dispensing unit has been filled with dosage material and set into the holder of a compatible dosage-dispensing instrument.

The housing can be a bottle-shaped container, for example a vial or a bottle of glass or plastic. Of course, the dosage dispensing unit, or the entire dosage-dispensing instrument, can also be an integral component of a larger system. For applications of this kind, the dosage-dispensing unit is preferably equipped with a connector area through which a vessel can be connected to the reservoir cavity. The vessel can be a feeder hose, a feeder pipe, a supplementary reservoir, a film pouch with or without tear seam, a tank, a silo or the like. These vessels can be joined to the connector area through a form-locking, force-fitting, or materially bonded connection.

To provide the dosage-dispensing unit with further positive properties, the surface of the dispensing head can be covered with a coating. It is conceivable to use an anti-bacterial coating, for example silver ions, or an electrically conductive coating which can be connected to ground in order to drain off electrostatic charges.

Furthermore, as disclosed for example in the inventor's US published application 2010/0147882, which is commonly-owned and co-pending, the dosage-dispensing unit can be made safe against contamination. In order to separate the dispensing head and the dosage material from each other, a hose-shaped film lining can be placed in the reservoir cavity and through the outlet, so that only the inside of the hose-shaped film can come into contact with the dosage material. The hose-shaped film can be the neck of a pouch, a section of endless liner material and the like, which is made of a suitable material, for example a polyethylene film. In order for the inventive oscillatory movements of the outlet lip to be transmitted to the film section covering this outlet lip, the respective portion of the film in the area of the outlet needs to be mechanically attachable to the first and second outlet lips through appropriate fastening means. Fastening means that can be used for this purpose include any state-of-the-art connection methods and elements such as force-fitting, materially bonded and form-locking connections, for example adhesive bonds, welded connections with integral tear-off threads, clamping strips, snap connectors and the like.

The dosage-dispensing unit is designed to be set into, and removed from, a dosage-dispensing instrument, so as to facilitate the exchange of dosage-dispensing units. Of course, a dosage-dispensing instrument can also have more than one holder, so that it can hold a plurality of dosage-dispensing units.

BRIEF DESCRIPTION OF THE DRAWINGS

The details of the dosage-dispensing unit are described with examples of embodiments that are illustrated in the drawings, wherein identical parts are identified by identical reference numbers and wherein.

DETAILED DESCRIPTION

Figure 1A:
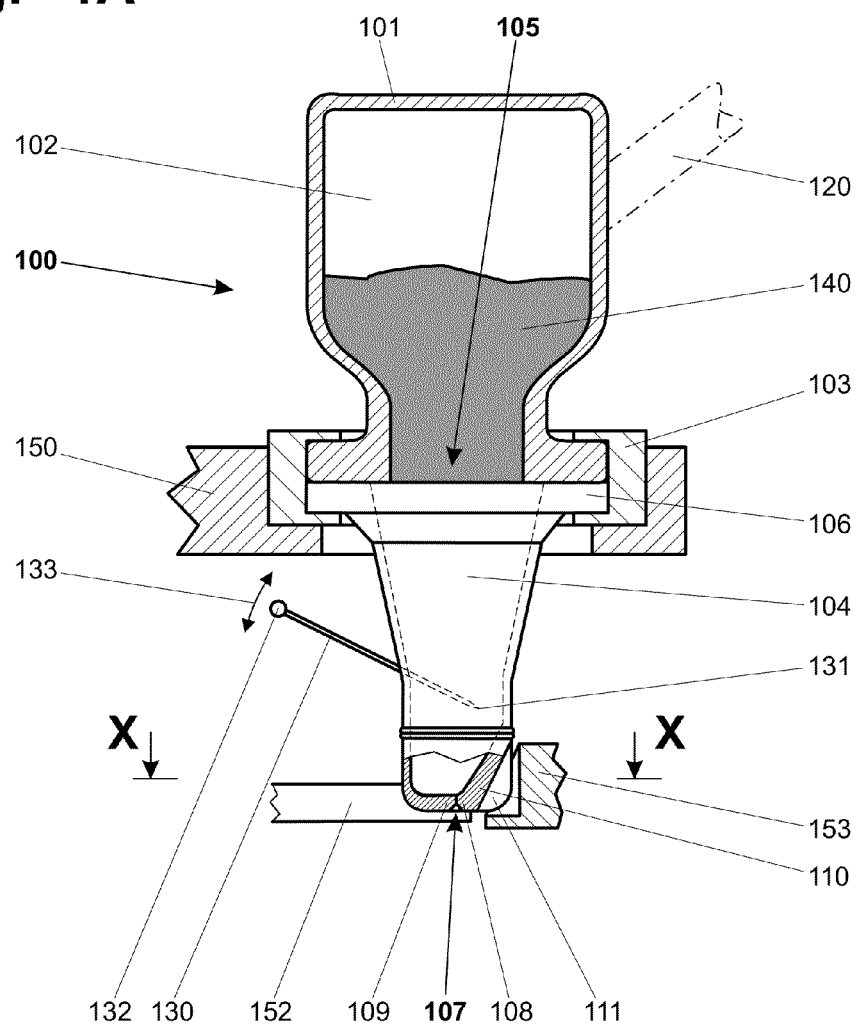
FIG. 1A is an upright sectional view of a dosage-dispensing unit according to the invention with a housing and, adjoining the latter, a dispensing head of an elastomeric material, and with a first motion-transmitting means with an integrally formed motion-transmitting member.

FIG. 1A, in an upright sectional view, schematically illustrates a dosage-dispensing unit 100 according to the invention with a housing 101. Inside the housing 101, a reservoir cavity 102 is formed to hold a dosage material 140.

The housing 101 is of a bottle-shaped design and has an opening 105 through which the reservoir cavity 102 can be filled. After the reservoir cavity 102 has been filled with dosage material 140, the housing 101 is connected in such a way by means of a mounting ring 103 to a dispensing head 104 of elastomeric material, that the dispensing head 104 completely covers the opening 105. In dosage-dispensing units of this generic type, after the dispensing head 104 has been joined to the housing 101, the reservoir cavity 102 also extends into the dispensing head 104, as the dispensing head 104 contains an empty space between the attachment flange 106, which serves as connector area, and a slit-shaped outlet orifice 107 that is formed on the dispensing head 104. As soon as the dosage-dispensing unit 100 has been turned into its operating position as shown in FIG. 1A, the dosage material 140 in the receptacle cavity 102 can move into the dispensing head 104 under the pull of gravity.

Of course, the housing 101 can also have a feeder conduit 120 for a continuous supply of dosage material, for example a feeder pipe as indicated by a dash-dotted outline.

Figure 1B:
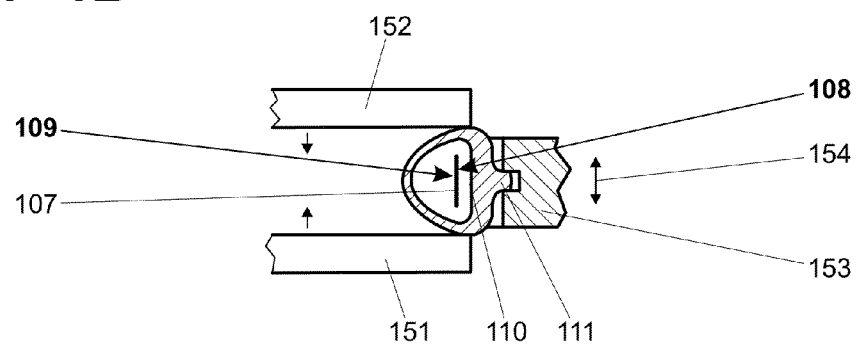
FIG. 1B is a sectional view in the plane X-X of the dosage-dispensing unit of FIG. 1A.

The dispensing head 104 has a first outlet lip 108 and a second outlet lip 109 which, when no force is applied to them, lie against each other and form the slit-shaped outlet orifice 107. The filled-up dosage-dispensing unit 100 is set into a dosage-dispensing instrument 150, which is shown only in a fragmentary way. The dosage-dispensing instrument 150 has two jaws 151, 152 which can be moved towards each other in order to generate lateral compressive forces on the dispensing head 104 that is positioned between the jaws 151, 152. As soon as the jaws 151, 152 begin to squeeze the dispensing head 104 together in the area of the outlet 107, as shown in FIG. 1B, the outlet lips 108, 109 separate from each other, whereby an opening is created through which dosage material 140 can flow out of the dosage-dispensing unit 100 under the influence of gravity. Thus, the manner in which the outlet 107 is opened is in accordance with the teachings of EP 0 527 976 B1, if the lateral compressive forces of the jaws 151, 152 acting on the dispensing head 104 are directed in the lengthwise direction of the outlet lips 108, 109. To close the outlet orifice 107, the jaws 151, 152 are moved away from each other until there are no longer any compressive forces acting on the dispensing head 104. To counteract the possibility of the dosage material 140 conglomerating into bridges inside the reservoir cavity 102, an activator needle 130 can be pierced through the elastomeric material of the wall of the dispensing head. The sharp point 131 of the activator needle 130 is inside the reservoir space 102, and the other end 132 is connected to an activator drive mechanism (not shown in the drawing). The drive mechanism can generate any kind of movements that are tailored to the dispensing head 104 and the dosage material 140 and are schematically indicated by the arc-shaped arrow 133.

So that oscillatory movements according to the invention can be imparted to the first outlet lip 108, the latter is adjoined by a first motion-transmitting means 110. The first motion-transmitting means 110 is a zone of the dispensing head 104 with an increased stiffness in comparison to the rest of the wall of the dispensing head in the area of the outlet orifice 107. This zone is more evident in FIG. 1B, which shows a sectional view of the dispensing head 104 in a plane that is indicated by the line X-X in FIG. 1A. Also evident in FIG. 1B are the jaws 151, 152 of the dosage-dispensing instrument 150, by means of which the outlet orifice 107 is opened and closed. Integrally formed on the first motion-transmitting means 110 is a nose-shaped motion-transmitting member 111. The latter is connected to a drive mechanism 153, of which only the coupler part is shown in FIGS. 1A and 1B. The drive mechanism 153 generates oscillatory movements 154 in the direction indicated by the double arrow, so that the first outlet lip 108 moves in its lengthwise direction relative to the second outlet lip 109. Preferably, these movements are of very small amplitude, so that they don't interfere with the tight closing of the outlet lips 108, 109.

Figure 2A:
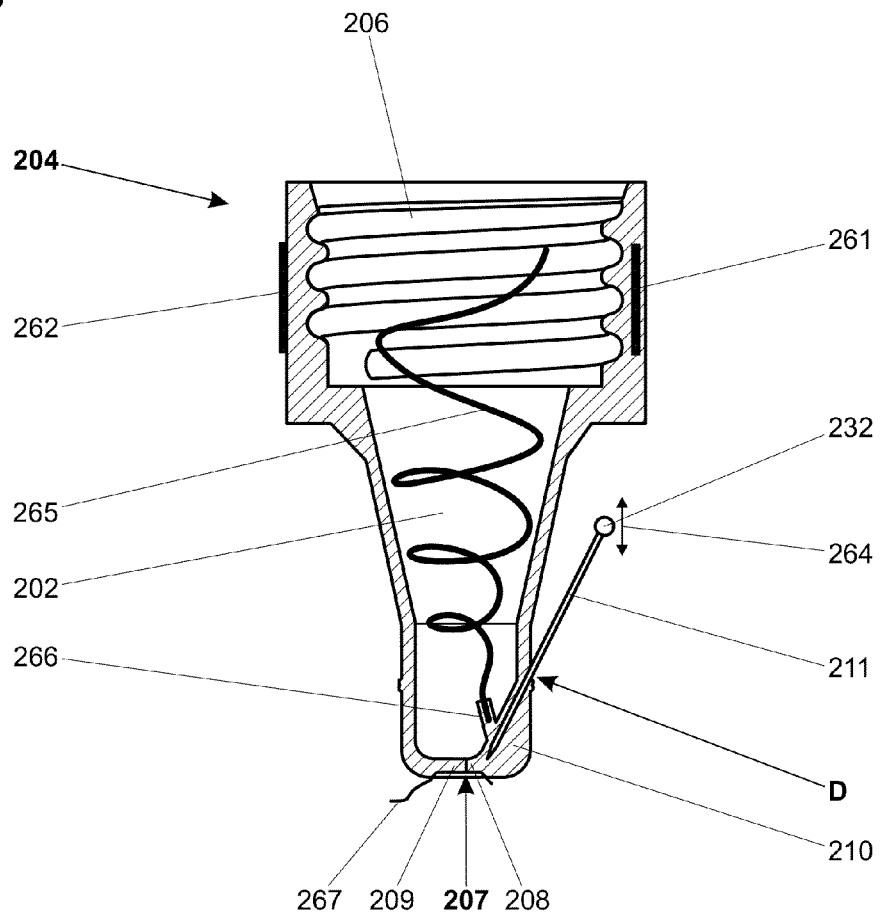
FIG. 2A is an upright sectional view of a dispensing head according to the invention that is made of an elastomeric material, with a first motion-transmitting means, with a needle-shaped motion-transmitting member, and with an actuator.
Figure 2B:
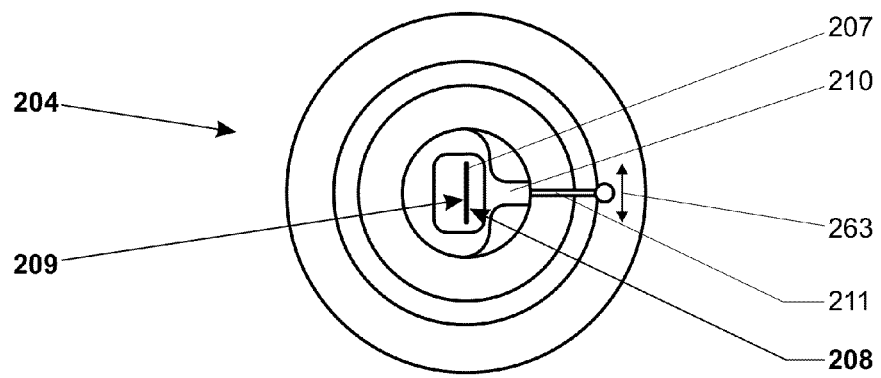
FIG. 2B is a view from below of the dispensing head of FIG. 2A.

FIG. 2A shows a dispensing head 204 of elastomeric material in an upright sectional view. In FIG. 2B, the same dispensing head 204 is shown in a view from below.

An internally threaded flange 206 which is integrally formed on the dispensing head 204 serves as a simple means of connecting the latter to a housing. The interior of the dispensing head 204 is configured as a hollow space which serves as reservoir cavity 202 for dosage material. Furthermore, an identifier means 261, for example an RFID transponder, can be imbedded in the dispensing head 204. Of course, it is also possible to arrange other means of identification such as labels, imprints 262 with alphanumeric information, color codes, matrix codes or bar codes on the surface of the dispensing head 204. Like the first embodiment in FIGS. 1A and 1B, the dispensing head 204 has a slit-shaped outlet orifice 207 which is delimited by a first outlet lip 208 and a second outlet lip 209. A bulked-up area adjoining the first outlet lip 208 forms a first motion-transmitting means 210. A needle-shaped motion-transmitting member 211, which is anchored in this motion-transmitting means 210, additionally increases the stiffness of the latter. As the cross-sectional profile of the dispensing head 204 in the vicinity of the entry point D of the needle-shaped motion-transmitting member 211 has a large area moment of inertia, the point D forms the center of rotation about which the motion-transmitting member 211 pivots when the oscillatory movements indicated by double arrows 263, 264 are acting on the free end 232 of the needle-shaped motion-transmitting member 211. These oscillatory movements 263, 264 are generated by a drive mechanism that is not shown in the drawing.

In the embodiment according to this example, two oscillatory movements 263, 264 are shown which are superimposed on each other, wherein the primary movement 263 indicated in FIG. 2B causes the first outlet lip 208 to oscillate in its lengthwise direction. Superimposed on this primary oscillatory movement 263 of the first outlet lip 208 in the lengthwise direction is a secondary oscillatory movement 264 as indicated in FIG. 2A, which is directed perpendicular to both the lengthwise direction and the closing direction of the outlet lip 208.

In addition, an actuator 265 is arranged in the reservoir cavity, which serves to eliminate powder bridges and/or to assist in moving the dosage material to the outlet orifice 207. The actuator 265 is configured essentially as a wire spiral which extends into the reservoir cavity. Of course, it is also possible to use differently configured actuators 265, such as sheet metal strips, rods, hooks and the like. The shape and design of the actuator 265 depend essentially on the flow properties of the dosage material. One end of the actuator 265 is anchored in a socket 266 which protrudes into the reservoir cavity 202 and is integrally formed on the motion-transmitting means 210. Thus, the oscillatory movements of the motion-transmitting means 210 can also be transmitted to the actuator 265.

FIG. 2A further shows a removable film 267 which covers the outlet orifice 207. After the dispensing head 204 has been connected to a housing, the film 267 can be removed. FIG. 2B shows the dispensing head 204 with the outlet orifice 207 exposed, i.e. with the film 267 removed.

Figure 3:
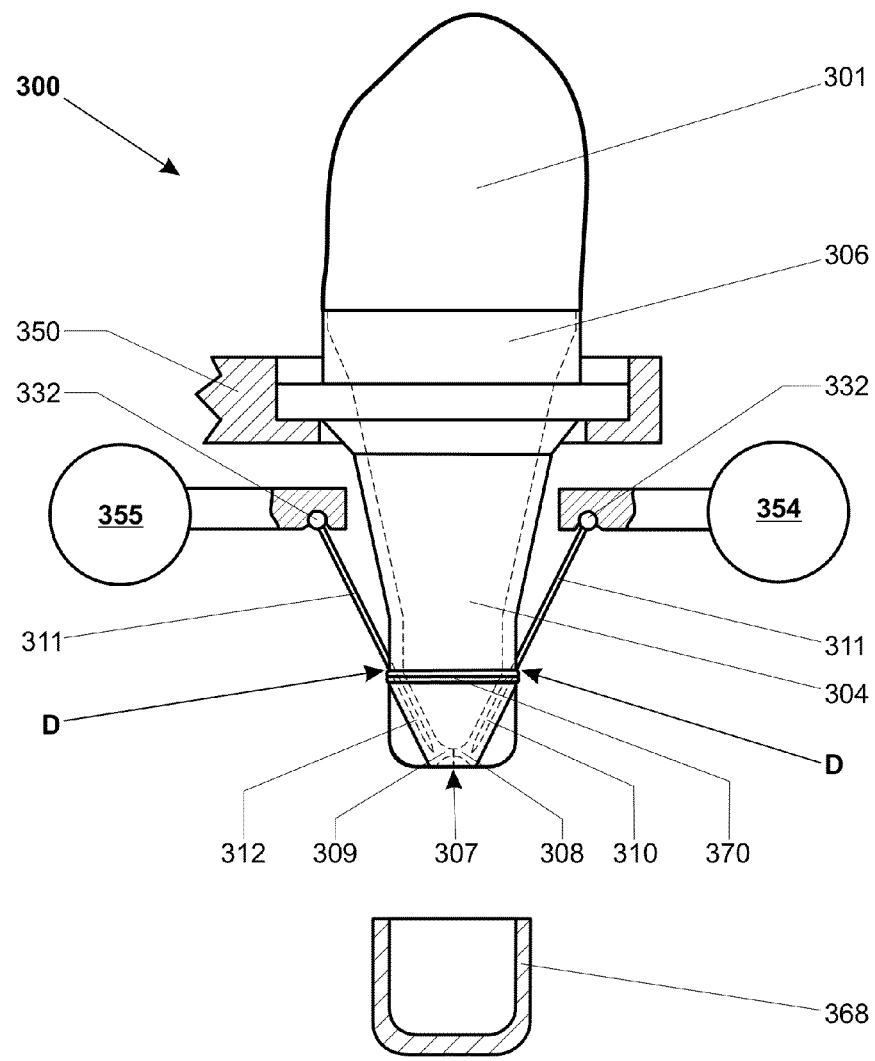
FIG. 3 is an elevation view of a dosage-dispensing unit according to the invention with a pouch-shaped housing, a dispensing head of elastomeric material which is joined to the housing, with a first and a second motion-transmitting means, and with a first and a second needle-shaped motion-transmitting element.
Figure 3:
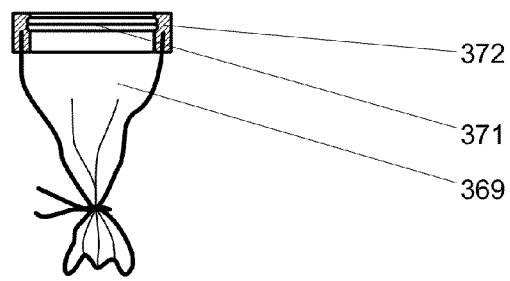

FIG. 3 illustrates a third example of a dosage-dispensing unit 300 in an elevation drawing. The dosage-dispensing unit includes a dispensing head 304 of elastomeric material with a weld flange 306. A pouch-shaped housing 301 is joined to the weld flange 306 through a materially integral bonding connection. The dosage-dispensing unit 300 is set in place on a dosage-dispensing instrument 350, of which only a fragmentary part is represented in the drawing.

As in the preceding example of FIG. 2A, the third embodiment shown in FIG. 3 likewise has a slit-shape outlet orifice 307 that is delimited by a first outlet lip 308 and a second outlet lip 309. A bulked-up area next to the first outlet lip 308 forms a first motion-transmitting means 310. A second motion-transmitting means 312 is arranged mirror-symmetrically relative to the central lengthwise axis of the dispensing head 304. The second motion-transmitting means 312 likewise serves to impart an oscillatory movement to the second outlet lip 309, wherein the respective oscillatory movements of the first outlet lip 308 and the second outlet lip 309 differ from each other at least in their respective amplitudes and/or by moving in opposite parallel directions relative to each other.

Implanted in each of the motion-transmitting means 310, 312 and thereby lending increased stiffness to the latter is a needle-shaped motion-transmitting member 311. As the cross-sectional profile of the dispensing head 304 in the vicinity of the entry points D of the needle-shaped motion-transmitting members 311 has a large area moment of inertia, the entry points D form the centers of rotation about which the motion-transmitting members 311 pivot when the free ends 332 of the needle-shaped motion-transmitting members 311 are subjected to the oscillatory movements whose direction is orthogonal to the plane of the drawing. These oscillatory movements are generated by the two schematically indicated drive mechanisms 354, 355, which are part of the dosage-dispensing instrument.

In order to also make the dosage-dispensing unit 300 suitable for use as a storage container, and further to prevent the outlet orifice 307 from being inadvertently opened in the course of manual or automated activities, a protective cap 368 can be added, to be put over the outlet orifice and to completely cover the outlet lips 308, 309 of the dispensing head 304. The protective cap 368, as shown in the drawing, is not removed until the dosage-dispensing unit 300 is set into the dispensing-unit holder of a compatible dosage-dispensing instrument 350.

As a means to improve the seal between the dispensing head 304 and the protective cap 368, a seal ring 370 is integrally formed on an elastomeric wall portion of the dispensing head 304 on the side that faces away from the reservoir cavity. The use of this seal ring 370 is not limited to holding the protective cap 368 more securely on the dispensing head 304 by contact pressure and/or providing a gas-tight seal. Optionally, this seal ring 370 can also be used to fasten an adjoining vessel 369, for example a tied-up hose as shown here. The vessel 369 has a connector area 372 with a groove 371 that fits over the seal ring 370. The form-fitting connection ensures a secure hold of the vessel 369 on the dispensing head 304 and can seal the ring gap between the dispensing head 304 and the adjoining vessel 369 sufficiently to prevent dosage material from escaping and contaminating the ambient environment. Of course, the protective cap 368 and the adjoining vessel 369 can also be used in combination with the previously described embodiments of FIGS. 1A and 2A.

Figure 4:
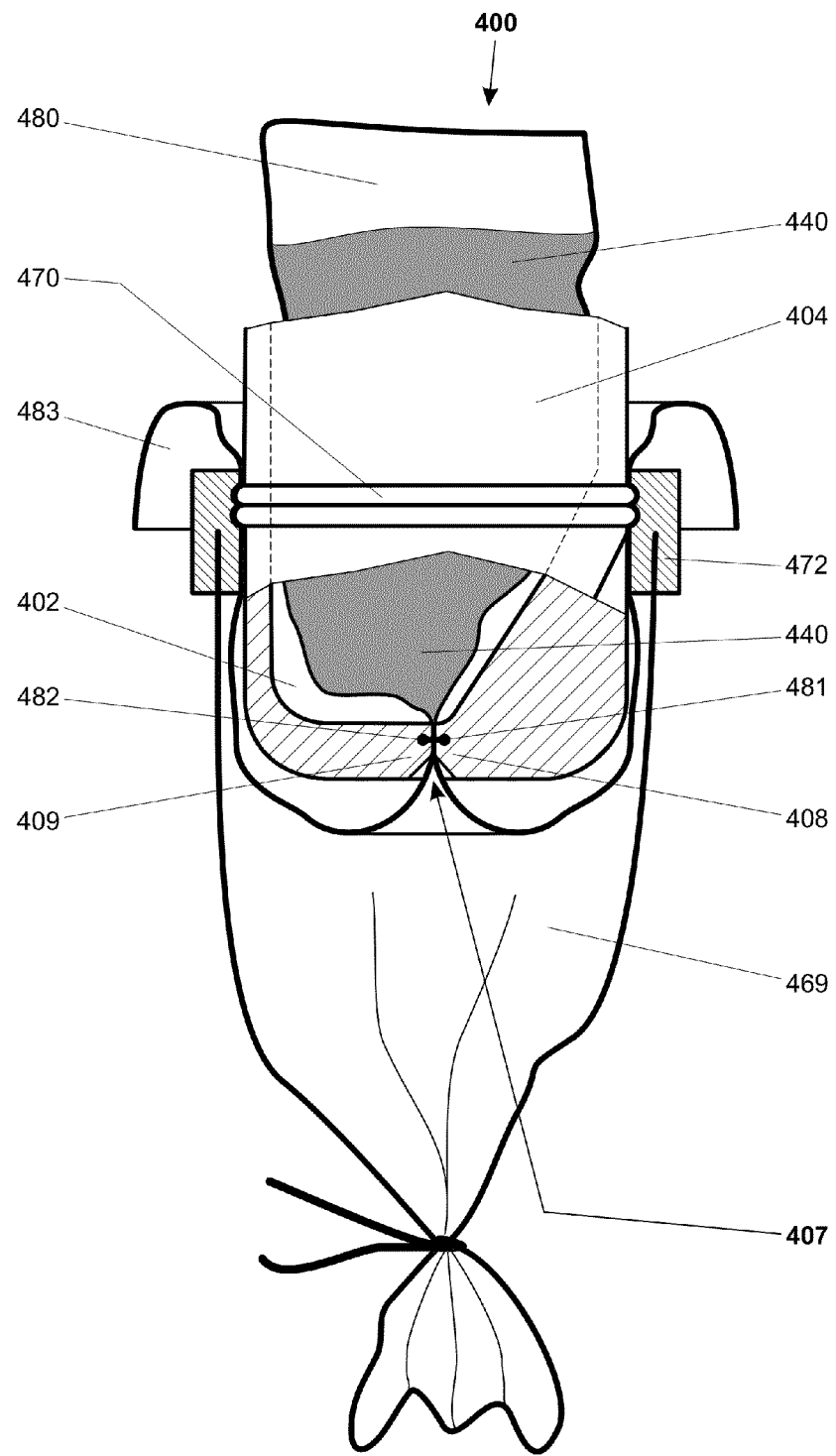
FIG. 4 is a partial section elevation view of a dosage-dispensing unit according to the invention, in a contamination-protected design version with a hose-shaped film liner which is placed in the reservoir cavity and pulled through the outlet orifice.

FIG. 4 represents an elevation drawing, partially in sectional view, of a dosage-dispensing unit 400 according to the invention, in a contamination-protected design version. The dosage-dispensing unit 400, more specifically the dispensing head 404, which is shown with a portion broken away, is analogous in its design layout to the embodiment shown in FIG. 1. Also included in FIG. 4 is the connectable vessel 469 which was shown in FIG. 3. As a means of separating the dispensing head 404 and the dosage material from each other, a hose-shaped film liner 480 is placed in the reservoir cavity 402 of the dosage-dispensing unit 400 and pulled through the outlet orifice 407. The end portion 483 of the hose-shaped film is pulled back over the seal ring 470 of the dispensing head 404. The end portion 483 is clamped in place on the dispensing head 404 by the connector area 472 of the connectable vessel 469. All of the dosage material 440 is inside the hose-shaped film liner 480 and can therefore never come into contact with the dispensing head, so that the latter is protected from contamination.

In order for the inventive oscillatory movements of the first outlet lip 408 to be transmitted to the film section covering this outlet lip 408, the respective portion of the film 480 in the area of the outlet orifice 407 needs to be attachable to the first and second outlet lips 408, 409 through appropriate fastening means 481, 482. In the example of FIG. 4, the fastening means is configured as a form-locking connection, wherein rib sections are imbedded in the film liner, which can be snapped into a groove that is formed on the outlet lips 408, 409. Obviously, this way of fastening represents only one of many possibilities for transmitting the movements of the first outlet lip 408 to the adjoining film section and to thereby ensure that the dispensing head 404 will function reliably in spite of the hose-shaped film liner 480 draping the outlet orifice 407.

Although the invention has been described through examples of specific embodiments, it is evident that numerous further variants can be created based on the teachings of the present invention, for example a dispensing head with several connector areas to allow a plurality of housings to be attached. A dispensing head could also have a plurality of outlet orifices, whose operation would require for each orifice a pair of jaws and a motion-transmitting member to transmit oscillatory movements to the outlet lips. As a further possibility in all of the foregoing examples, additional features could be incorporated in the dispensing head or in the housing, for example identifier means such as bar codes, matrix codes and/or radio-frequency identifier means (RFID transponders). The housing and/or dispensing head could also be equipped with inlet connectors to inject protective gases into the dosage-dispensing unit, or there could be chamber cavities for desiccants arranged in the housing and/or dispensing head. It is considered self-evident that the specific configuration and the coupling connection of the motion-transmitting member to the motion-transmitting element on one side and the drive mechanism on the other is not limited to the illustrated example but lies within the discretion of the design engineer.

What is claimed is:

1. A unit for dispensing a dosage material of a powdery or granular consistency, comprising:
    a housing having at least one reservoir cavity formed therein for receiving the dosage material;
    at least one dispensing head, comprising an elastomeric material, each dispensing head having an outlet orifice that is closed in a slit-shape in its non-deformed state and is opened to a variable width through application of a lateral compressive force, the outlet orifice delimited by first and second outlet lips; and
    means for imparting lateral oscillatory movement to the first outlet lip relative to, and in a lengthwise direction of, the second outlet lip, the means for imparting lateral oscillatory movement also arranged to impart superimposed secondary oscillatory movement that is orthogonal to the lengthwise direction and to the closing direction of the outlet lips.

2. The dosage-dispensing unit of claim 1, further comprising:
    a means for imparting oscillatory movement to the second outlet lip,
    wherein the oscillatory movements imposed by the respective means are distinguished from each other by at least one of: different amplitudes and opposed parallel directions.

3. The dosage-dispensing unit of claim 2, wherein:
    the means for imparting oscillatory movement comprises a zone of increased stiffness in the elastomeric material of the dispensing head, the zone of increased stiffness adjoining the respective outlet lip and comprising an area to connect to a motion-transmitting member.

4. The dosage-dispensing unit of claim 3, wherein:
    the zone of increased stiffness comprises a nose-shaped projection.

5. The dosage-dispensing unit of claim 3, wherein:
    the motion-transmitting member comprises a needle that joins the means for imparting oscillatory movement to a drive mechanism.

6. The dosage-dispensing unit of claim 1, further comprising:
    an actuator, arranged in the reservoir cavity and connected to the means for imparting oscillatory movement.

7. The dosage-dispensing unit of claim 6, wherein:
    the actuator comprises a wire spiral.

8. The dosage-dispensing unit of claim 1, further comprising:
    an activator needle, arranged piercingly through an elastomeric wall of the dispensing head, a first, sharp-pointed end of the activator needle is disposed inside the reservoir cavity and a second, opposite end connected to either: an activator drive mechanism of the means for imparting oscillatory movement or to an activator drive mechanism.

9. The dosage-dispensing unit of claim 1, further comprising:
    a protective cap that, when operatively placed, completely covers the outlet lips of the dispensing head.

10. The dosage-dispensing unit of claim 1, further comprising
    a seal ring, integrally formed on an elastomeric wall portion of the dispensing head on the side thereof that faces away from the reservoir cavity.

11. The dosage-dispensing unit of claim 1, further comprising:
    a removable film that covers the outlet orifice prior to use.

12. The dosage-dispensing unit of claim 1, further comprising:
    a connector area, adapted for connecting the reservoir cavity to a vessel.

13. The dosage-dispensing unit of claim 1, wherein:
    the dispensing head comprises a connector area surrounding the outlet orifice for a vessel.

14. The dosage-dispensing unit of claim 1, wherein:
    the surface of the dispensing head is covered with a coating.

15. The dosage-dispensing unit of claim 1, further comprising:
    a hose-shaped film lining, laid in the reservoir cavity and through the outlet orifice, wherein sections of the hose-shaped film lining in the area of the outlet orifice are mechanically attached to the first and second outlet lips, transmitting oscillatory movements of each outlet lip to the corresponding film section connected thereto.

16. The dosage-dispensing unit of claim 1, wherein:
    the means for imparting oscillatory movement comprises a zone of increased stiffness in the elastomeric material of the dispensing head, the zone of increased stiffness adjoining the respective outlet lip and comprising an area to connect to a motion-transmitting member.

17. The dosage-dispensing unit of claim 16, wherein:
    the zone of increased stiffness comprises a nose-shaped projection.

18. The dosage-dispensing unit of claim 16, wherein:
    the motion-transmitting member comprises a needle that joins the means for imparting oscillatory movement to a drive mechanism.

19. A dosage-dispensing instrument, comprising:
    at least one dosage-dispensing unit, comprising:
        a housing having at least one reservoir cavity formed therein for receiving the dosage material;
        at least one dispensing head, comprising an elastomeric material, each dispensing head having an outlet orifice that is closed in a slit-shape in its non-deformed state and is opened to a variable width through application of a lateral compressive force, the outlet orifice delimited by first and second outlet lips; and
    means for imparting lateral oscillatory movement to the first outlet lip relative to, and in a lengthwise direction of, the second outlet lip, the means for imparting lateral oscillatory movement also arranged to impart superimposed secondary oscillatory movement that is orthogonal to the lengthwise direction and to the closing direction of the outlet lips.

* * * * *